(12) United States Patent
Iannotti et al.

(10) Patent No.: US 7,109,888 B2
(45) Date of Patent: Sep. 19, 2006

(54) METHOD AND APPARATUS FOR DETECTING AND DESTROYING INTRUDERS

(76) Inventors: Joseph A. Iannotti, 2 Glenridge Rd., Whitesboro, NY (US) 13492; Richard J. Gawrelski, 224 Brookside Ave., Amsterdam, NY (US) 12010

(*) Notice: Subject to any disclaimer, the term of this patent is extended or adjusted under 35 U.S.C. 154(b) by 377 days.

(21) Appl. No.: 10/267,703

(22) Filed: Oct. 9, 2002

(65) Prior Publication Data
US 2003/0151509 A1  Aug. 14, 2003

Related U.S. Application Data
(60) Provisional application No. 60/349,509, filed on Jan. 18, 2002.

(51) Int. Cl.
*G08G 1/01* (2006.01)

(52) U.S. Cl. .................... 340/935; 340/541; 324/66
(58) Field of Classification Search ............ 340/935, 340/541, 548, 564, 596, 598, 666, 825.36, 340/825.49; 342/357.01, 459; 324/66, 67
See application file for complete search history.

(56) References Cited

U.S. PATENT DOCUMENTS

| 3,690,259 | A | * | 9/1972 | Piazza et al. ............ 102/218 |
|---|---|---|---|---|
| 3,754,508 | A | * | 8/1973 | Dalton .................... 102/215 |
| 3,763,482 | A | | 10/1973 | Burney et al. |
| 3,983,819 | A | * | 10/1976 | Fairbanks et al. ......... 102/266 |
| 4,040,354 | A | * | 8/1977 | Stern ..................... 102/425 |
| 4,110,730 | A | * | 8/1978 | Varecka et al. ........... 367/135 |
| 4,630,110 | A | | 12/1986 | Cotton et al. |
| 5,144,125 | A | | 9/1992 | Carter et al. |
| 5,198,614 | A | * | 3/1993 | de la Haye et al. ........ 102/401 |
| 5,250,769 | A | | 10/1993 | Moore |
| 5,477,217 | A | | 12/1995 | Bergan |
| 5,600,086 | A | * | 2/1997 | Lemonnier ............... 102/424 |
| 5,695,859 | A | | 12/1997 | Burgess |
| 5,936,233 | A | * | 8/1999 | Nunnally ................. 250/221 |
| 6,072,130 | A | | 6/2000 | Burgess |
| 6,130,627 | A | | 10/2000 | Tyburski et al. |
| 6,748,869 | B1 | * | 6/2004 | Boyer et al. ............. 102/428 |

* cited by examiner

Primary Examiner—John Tweel, Jr.

(57) ABSTRACT

A method and apparatus employing an array of spaced detectors and a detection circuit to detect disturbance of first and second conductors and provide signals to a computer system to determine both the presence of the intruder and the direction of travel of the intruder. The velocity of the intruder's travel may also be determined. When used with a destruction device to destroy an intruder such as an explosive shell, the lob time and the killing distance may also be calculated and used to fire the shell and to explode it at a position to destroy the intruder. Often the intruder is an armored vehicle or a tank. The conductors may be spaced in an array that has the appearance of a spider web. The conductors may be light weight conductive elastomeric conductors.

18 Claims, 2 Drawing Sheets

METHOD AND APPARATUS FOR DETECTING AND DESTROYING INTRUDERS

This application claims the benefit of provisional application entitled "conductive elastomer position detection, U.S. Provisional Patent Application No. 60/349,509, filed Jan. 18, 2002, which is hereby incorporated by reference in its entirety.

FIELD OF THE INVENTION

This invention relates to an intrusion detection system and also to a method of destroying the intruder which may be an armed vehicle such as a tank.

BACKGROUND OF THE INVENTION

A large number of detection systems used sensor wires for detecting the presence of an intruder into a space by the intruder pressing on a sensor wire that may be on or beneath the surface. Various detection systems in prior art patents, U.S. Pat. Nos. 4,527,150; 5,021,766; 4,482,890 and 4,450,434 used optical fibers, coaxial cables, acoustical waves, pressure switches to detect people who may be intruding onto a space.

The present invention is directed to not only detecting the presence of an intruder, but also to determining the direction of travel of the intruder particularly if the intruder is a mobile vehicle traveling at a relatively fast velocity. In the illustrated embodiment of the invention, the intruder is a tank having a velocity typically in the range of 7 meters per second (7 m/s) to 22 m/s and it is desired to provide a tripwire system that is reliable, accurate and is low cost so that it can be deployed in various terrains.

SUMMARY OF THE INVENTION

In accordance with the present invention, there is provided an intruder detection system having an array of spaced conductors and a detection circuit that detects disturbances of a first conductor and then a spaced second conductor and sends a signal to a computer system to determine not only the presence of the intruder but also the direction of travel of the intruder. Preferably, the computer system also determines the velocity of the intruder and causes the firing of an explosive device such as a shell with a lob time and aim to explode within a killing distance of the intruder vehicle.

In the preferred embodiment of the invention, the array of spaced conductors includes radially extending conductors from a central location, extending a predetermined distance, e.g., 20–70 meter length. A trade-off exists between the number of radially extending tripwire conductors and their length for a given coverage where there is needed a two wire contact, i.e., a first hit or disturbance of a first trip and then a second hit or disturbance of a second tripwire. The two wire contact is desired to determine the target's location, direction of travel and speed of travel so that an explosive shell as from a mortar or artillery piece may be lobbed to intercept the intruding vehicle.

In accordance with the preferred embodiment of the invention, the conductors are aligned in a spider web array with circumferentially extending conductors joined to radially extending conductors. If a first radially extending tripwire is tripped as the intruding vehicle rolled over and displaces insulation on a coaxial tripwire and then a second spaced tripwire is similarly tripped then the speed of the intruder is calculated as is the lob time for the shell so that the shell is directed to a spot located on the line of travel and located at the distance the intruder vehicle should have traveled after the second trip.

The tripwire array should be light enough so that it can be easily deployed or laid even though the conductors may be quite long, e.g., 20 to 70 meters in length for a radially extending wire. The preferred wire is a coaxial cable having an internal center conductor with an outer tubular-conductor thereabout. When pressure is applied to the outer material by an external force, such as the intruder, the outer conductor is displaced changing an electrical characteristic of the tripwire such as a change in current flow. The resultant current flow can be used to calculate the linear distance down the wire to the impact location or hit by the intruder. Herein, the preferred coaxial conductor comprises a wire with an outer insulator thereon inside of an outer exterior conductive elastomeric tube. The pressure from the intruding vehicle displaces the insulation causing a point of contact between the outer conductive elastomeric and the center conductor wire.

In accordance with another embodiment of the invention, the tripwire may be in the form of an optic fiber tripwire which breaks at the point of contact by the intruder and linear distance location of the break may be determined by an optical time domain reflectometer. The preferred fiber optic may be a single mode, glass fiber of about 9 microns. Preferably, the glass fiber is that it is durable enough to withstand deployment of 20–30 meters in a radial direction and yet fragile enough to break when subjected to pressures in the range of 10–15 psi from a tank. In accordance with a further embodiment of the invention, the detection system may deploy a tripwire array of ultrasonic conductors that would have an ultrasonic pulse injected through a hollow tubular conductor. When the tubular conductor is collapsed by the intruder, the time delay between signal generation and reflection signal detection can be measured to locate the intruder's collapse of the tubular conductor.

DETAILED DESCRIPTION OF THE PREFERRED EMBODIMENT

Figure 3:
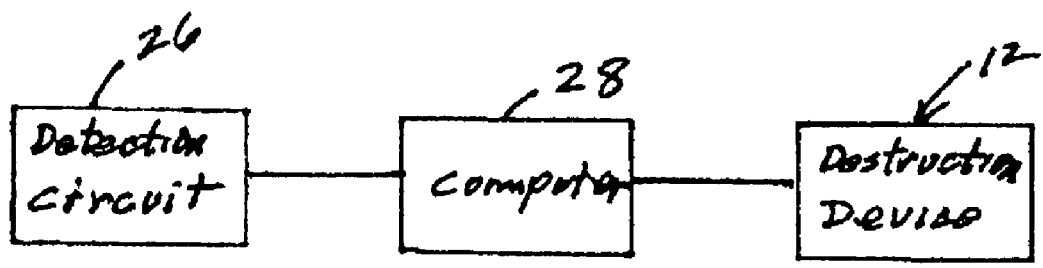
FIG. 3 is a diagrammatic view of a tripwire system constructed in accordance with the preferred embodiment of the invention.

As shown in the drawings for purposes of illustration, the invention is embodied in an intruder detection system 10 that may also include an explosive destruction device 12 (FIG. 3) in the form of a mine, artillery piece, or mortar. In the case of the mortar and the artillery piece, the intruder detection system is used to determine the location, bearing, i.e., direction of travel, and distance or time to impact the traveling intruder.

Figure 1:
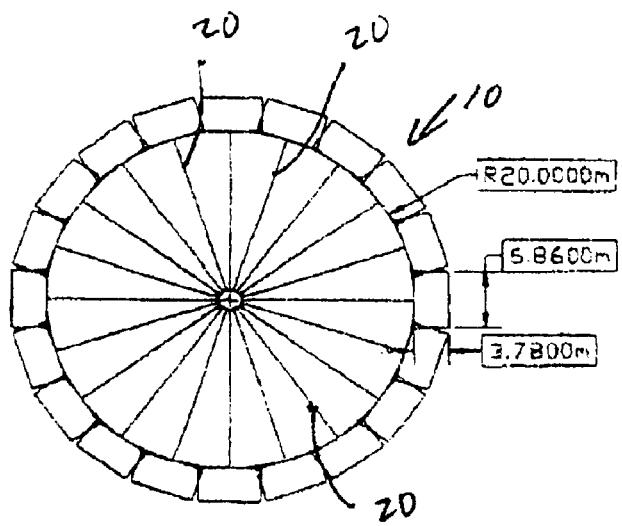
FIG. 1 is a plan diagrammatic view of an intruder detection system having an array of tripwires constructed with and embodying the invention.
Figure 2:
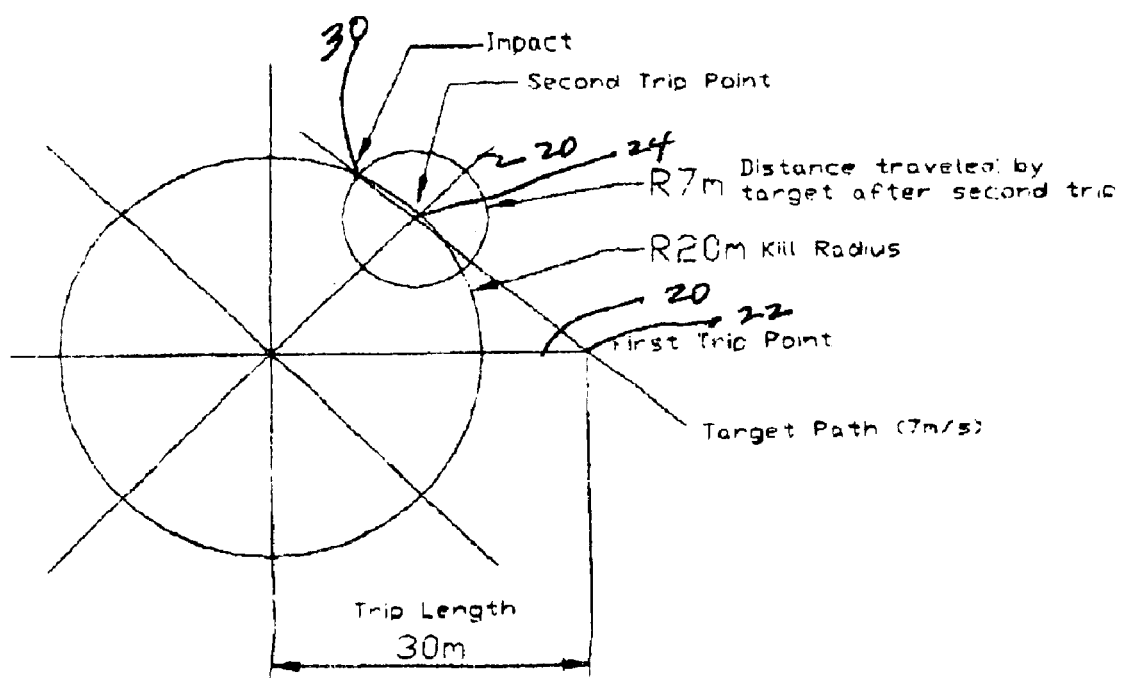
FIG. 2 is a diagrammatic view of a path of an intruding vehicle impacting the array of tripwires at two trip points and showing the distance traveled and the point of impact.

In accordance with the preferred embodiment of the invention, the system 10 includes an array of conductors or tripwires 20 (FIG. 1 and 2) arranged at spaced locations so that an intruding tank or other vehicle will be detected at a first trip point 22 (FIG. 2) and then detected at a second trip point 24 (FIG. 2). The electrical signals from the detection circuit 26 are sent to a computer or calculating device 28 that determines the distance that the intruding vehicle will travel so that the munition may be lobbed to impact the targeted vehicle at the impact point 30 (FIG. 2).

In a first example, eight tripwires are provided for a tank traveling at 7 m/s and using a lob time of 1 second for the munition, the use of tripwires of 30 meter length provides almost complete coverage with a 19.2 meter kill radius (FIG. 2).

The speed of the target vehicle and the lob time drastically affects the apparent kill radius of the munition. For example, if the tank speed is 22 m/s rather than 7 m/s and the lob time remains at 1 second, the array would have sixteen tripwires of about 70 meters in length to maintain the same 20 meter coverage.

Figure 4:
FIG. 4 is a cross-sectional view of a coaxial tripwire prior to intrusion.

The preferred tripwire 20 is a conductive elastomeric tripwire that is thin and lightweight and yet has sufficient flexibility and strength that it can be deployed automatically by deployment equipment as from a wound or reel configuration. The illustrated tripwire shown in FIG. 4 has a metal internal conductor or wire 34 surrounded by a highly conductive elastomeric tube 36. The wire 34 may be a distribution resistance wire, where the resistance per foot is a good measurable value. By use of a single voltage divider in the detection circuit 26, the distance to the target vehicle applying the pressure can be determined by calculating the overall resistance of the cable. The thickness of the tripwire can range from 10–42 ohms/foot depending on the thickness of wire used. These resistance values can be easily measured to provide distance measurement that are fairly accurate.

Figure 4A:
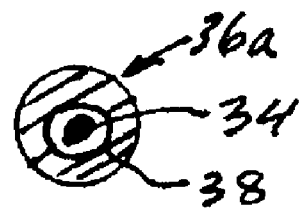
FIG. 4a is a cross-sectional view of a tripwire constructed in accordance with another embodiment of the invention.

Preferably, this tripwire is non-conducting until the intruder vehicle places enough pressure on the cable to increase the contact surface between the conductive elastomeric and nickel-chromium wire that will cause current conduction proportional to the position the pressure is applied. If desired, the center conductor may have a thin insulator 38 (FIG. 4a) thereon between it and the center conductor to prevent inadvertent conduction.

Turning now in greater detail to the illustrated embodiment of the invention, the detection system 10 may use a set of tripwires 20 extending radially from a mine type of destruction device 12 to a kill/sensing distance of at least 20 meters. By way of example, to achieve one hundred percent (100%) coverage at 20 meters with a Russian T-90 style tank, there should be a minimum of 20 equally spaced 20 meter tripwires (See FIG. 1). If two wire contact is necessary, in order to determine target travel direction and speed, longer tripwires will be required to maintain the same kill radius. Due to the length of each tripwire (20 meter, minimum), the tripwire must be as light and thin as possible. The tradeoff exists between the number and length of the tripwires required for given coverage (19.2 meter, minimum kill radius) (See FIG. 2). Note that the speed of the target and lob time drastically affects the apparent kill radius of the munition. As an example, if the speed of the target were equal to the max speed of a T72 tank (22 m/s), and lob time remains 1 s, one would need sixteen, 70 meter tripwires for approximately 20 meter coverage.

In accordance with an embodiment of the invention, the tripwire may be an optic fiber tripwire. For range finding, a one fiber optic tripwire 20 may be used in accordance with another embodiment of the invention. The fiber optic tripwire will break at the point of contact with a heavy vehicle. One way to determine the location of the break is by using an OTDR (Optical Time Domain Reflectometer). The fiber optic tripwires could be single mode (9 micron) glass fiber. Bare fiber would be the best because it would be more fragile, but the fiber may need to be clad due to possible measurement errors caused by sunlight. Coating the bare fiber with a sprayed on film could reduce optical effects of sunlight and still keep the fiber fragile enough to break if run over. Typical pressures encountered with heavy tanks are in the range of 10–15 psi. The issue may then become deployment. Launching an unclad glass fiber to lengths of 20–30 meters may be difficult due to fiber breakage. The optic fibers have to be durable enough to withstand deployment from the mine to distances of more than 20 meters, yet fragile enough to break when subject to pressures in the range of 10–15 psi.

Figure 5:
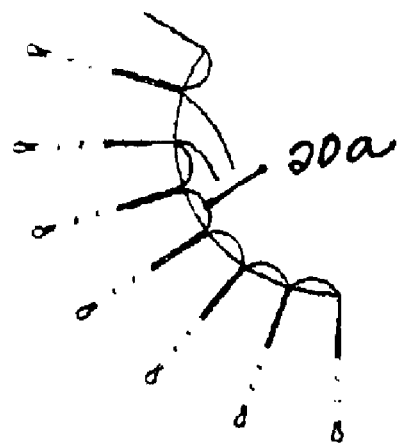
FIG. 5 illustrates a continuous loop fiber optic tripwire array in accordance with another embodiment of the invention.

The use of multiple optical fibers presents another problem, multiplexing the OTDR or using multiple OTDR's. To reduce cost when using the latter, one could use a single fiber 20a (FIG. 5) in a continuous loop out and back through the mine. Breakage location could then be determined with a single OTDR and without using a complex multiplexing scheme. A minimum of two OTDR's operating at different wavelengths may still be necessary if two wire contact is required. This would allow distance measurement from both ends of the single fiber to measure the distance to the two breaks. WDM could be used to multiplex the fibers if the OTDRs have the ability of changing measurement wavelength. This would allow eight individual 30+ meter fibers.

The diameter of the clad fiber would be approximately 0.125 inches. With the single fiber out and back approach, this would be a length of approximately 500 meters and a volume of over 240 cubic inches. With eight single strands of fiber, the volume would be about 117 cubic inches of fiber. This would be difficult to coil and launch from the mine.

Potential problem areas of using a fiber optic tripwire system 10 are as follows:

OTDR may be expensive and a high power consumer.
Fiber may be too fragile to deploy reliably due to force required to dispense 20 m.
If fiber does not break, no detection is possible.
Single loop will not work if two target bearings are required unless the second break point occurs between the first and the OTDR or two OTDR's are used.

On the other hand, benefits from using as fiber optic tripwire system 10 are as follows:

Impervious to corrosion and EMI countermeasures.
If thinly clad, will be nearly invisible on the ground.

In accordance with another embodiment of the invention, the range detecting tripwire is a thin, (0.1" diameter) hollow, highly conductive elastomer with a distributed resistance running through the center. Nickel-chromium wire is one example of a distributed resistance, where the resistance per foot is a good measurable value. By using a simple voltage divider, the mine can determine the distance to the object applying pressure by calculating the overall resistance of the cable. Depending on the thickness of wire used, the resistance of the nickel-chromium wire can range from 10–42 ohms/foot. This easily measurable value could achieve good distance accuracy.

The preferred method of operation is to have the tripwire non-conducting until pressure is applied to the elastomer/ wire combination. The pressure will increase the contact surface between the conductive elastomer and the nickel-chromium wire that will cause current conduction proportional to the position the pressure is applied. Depending on test results, one may use a center conductor with less resistance if the conductive elastomer has a higher resistance.

One potential problem that may be encountered includes corrosion of the center conductor that can reduce accuracy or cause outright failure. In addition, some minimal conduction may occur which would have to be calibrated out on initial deployment or periodically. To overcome this problem, it is preferred to coat the center conductor with a thin insulator to prevent inadvertent conduction.

Benefits accruing from the use of the conductive elastomeric tripwire include low cost, durability as far as deployment and breakage are concerned, low power consumption, and fast sample rates with simple A/D converters available on most micro controllers.

The diameter of the conductive elastomer would be approximately 0.060 to 0.100 inches. Eight 30 meter tripwires at 0.060" thickness using 36 or 38 AWG wire internally would amount to a total volume of 27 cubic inches.

Potential problem areas of using a conductive elastomeric tripwire system 10 are as follows:

Susceptibility to corrosion

Variation in conductivity vs. time and temperature

Possible difficulties insulating the center conductor

On the other hand, benefits from using a conductive elastomeric tripwire system 10 are as follows:

Low cost

Low power consumption

Simple design

Durable

In accordance with a still further embodiment of the invention, the tripwire may be an ultrasonic tripwire. The ultrasonic tripwire would use a small piezo transducer to inject an ultrasonic pulse through a hollow tube and measure the time delay before a reflection is detected. This tube would require a flat perpendicular end surface to minimize dispersion of the waveform. The end cap would be necessary to prevent dirt or similar material from entering the sound tube and causing a false reading. If necessary, the tube could be filled with a gas or liquid to prevent inadvertent collapsing.

Potential problems include the fact that when the sound tube is collapsed, the shape of the reflecting surface will be conical or wedge shaped which will cause dispersion of the reflected ultrasonic pulse. This may make timing more difficult to determine due to reverberations, echos and overall destructive signal attenuation.

Another potential problem area associated with using a conductive elastomeric tripwire system 10 are as follows:

Abnormal shape of collapsed tube attenuates signal

May require high power consumption

Unknown size of available ultrasonic transducers

On the other hand, the main benefit from using the ultrasonic tripwire for the detection system 10 is that it is impervious to corrosion.

Of the embodiments discussed herein, it appears the easiest and most cost effective system is the conductive elastomer with a center conductor wire.

In accordance with a still further embodiment of the invention, discrete sensors, similar to touchpads on laptop computers for mouse control are placed every few feet along a tripwire. This appeared difficult to produce in a small enough footprint, and would result in a rather inaccurate distance measurement, therefore that the idea was not pursued. Other embodiments include a variation on the fabrication of the elastomer tripwire. Two half shells of copper, or other conductive material could be extruded or deposited on the inside of the elastomer. This would replace the wire. The distance could be measured by the resistance of the copper coat when compressed together to complete the circuit.

What is claimed is:

1. An apparatus for detecting an intruder comprising:
   an array of spaced conductors for laying on the ground in a predetermined pattern;
   an electrical detection circuit connected to the array of conductors to detect at least a first disturbance of a first conductor and a second disturbance of a second conductor in the array and to provide electrical signals;
   a computing device connected to the electrical circuit to determine from electrical signals provided by the electrical detection circuit the location of the intruder, the direction of travel of the intruder, and the velocity of travel of the intruder.

2. An apparatus in accordance with claim 1 wherein the array of spaced conductors comprises:
   conductors laid radially from a central axis to form at least a portion of the array.

3. An apparatus in accordance with claim 2 wherein the array of spaced conductors comprises:
   a spider web form of array circumferentially extending conductors joined to the radially extending conductors.

4. An apparatus in accordance with claim 1 wherein the conductors comprise:
   conductive elastomeric wires having an outer conductive tube and having an internal wire within the outer conductive tube being displacable by the intruder to cause a change in their electrical characteristics which is detected by the electrical detection circuit.

5. An apparatus in accordance with claim 1 wherein the conductors comprise:
   fiber optic conductors; and
   a device for providing an optical signal for the fiber optic conductors that has its characteristics changed with disturbance of the fiber optic conductors by the intruder.

6. An apparatus in accordance with claim 1 wherein the conductors comprise:
   ultrasonic conductors having an ultrasonic sonic signal that is disturbed by the intruder.

7. An apparatus in accordance with claim 1 comprising:
   a device for shooting an explosive at the intruder and using the information provided by the computing device as to the location, direction of travel and velocity of travel of the intruder to aim the explosive and to lead the explosive to hit the traveling intruder.

8. An apparatus in accordance with claim 1 wherein:
   at least eight conductors are laid radially and extend a minimum distance of 20 meters.

9. An apparatus in accordance with claim 8 wherein:
   at least twenty conductors are laid radially.

10. An apparatus in accordance with claim 1 wherein the conductors are laid radially and extend to provide a kill, sensing distance of at least twenty meters.

11. A method of detecting and destroying intruders comprising:
    laying an array of spaced conductors on the ground in a predetermined pattern;
    detecting an intrusion by the intruder which is disturbing first and second conductors in the array;
    determining the direction of travel and velocity of travel of the intruder; and
    firing an explosive at the intruder using the location, direction of travel, and velocity of the intruder at the time of detection to aim the explosive to destroy the intruder.

12. A method in accordance with claim 11 wherein the detecting the disturbance comprises:
    providing an electrical circuit connected to the spaced conductors and detecting a change in characteristics of the electrical detection circuit due the disturbance of the conductors by the intruder.

13. A method in accordance with claim 12 comprising:

providing conductive elastomeric wires as the conductors; and displacing an outer conductive tube on the elastomeric wires to cause a change in the electrical detection circuit.

14. A method in accordance with claim 12 comprising:

providing fiber optic conductors in the array; and disturbance of the optic fiber causing change in the electrical characteristics of the electrical detection circuit.

15. A method in accordance with claim 12 comprising:

providing an optical signal in the fiber optic conductors that changes upon disturbance of the fiber optic conductors in the array.

16. A method in accordance with claim 11 comprising:

laying the spaced conductors radially from the central point on the ground to form an array having radially extending conductors.

17. A method in accordance with claim 16 comprising:

laying a spider web array of conductors on the ground to detect intruders.

18. A method in accordance with claim 11 comprising:

detecting intrusion by a motor driven vehicle and calculating the location, speed of travel and direction of travel of the vehicle; and determining the lob time of the explosive in the air to meet the intruder as it continues to presumably travel in the same direction and at the same speed.

* * * * *

UNITED STATES PATENT AND TRADEMARK OFFICE
CERTIFICATE OF CORRECTION

PATENT NO.       : 7,109,888 B2                                              Page 1 of 1
APPLICATION NO.  : 10/267703
DATED            : September 19, 2006
INVENTOR(S)      : Joseph A. Iannotti et al.

It is certified that error appears in the above-identified patent and that said Letters Patent is hereby corrected as shown below:

On the Title page:

Please insert:

--(73) Assignee: Alion Science and Technology Corporation, McLean, Vienna, (US)--

--(74) Attorney, Agent, or Firm – Staas & Halsey LLP--

In the Specification:

Claim 4; Col. 6, line 22, change "displacable" to --displaceable--

Signed and Sealed this

Sixth Day of February, 2007

JON W. DUDAS
*Director of the United States Patent and Trademark Office*